(12) United States Patent
Chen

(10) Patent No.: US 6,220,111 B1
(45) Date of Patent: Apr. 24, 2001

(54) BICYCLE SPEED CHANGING DEVICE

(76) Inventor: Chieh-Yuan Chen, No. 2, Alley 2, Lane 847, Chung San Road, Shen Kang Hsian, Taichung Hsien (TW)

( * ) Notice: Subject to any disclaimer, the term of this patent is extended or adjusted under 35 U.S.C. 154(b) by 0 days.

(21) Appl. No.: 09/371,131

(22) Filed: Aug. 10, 1999

(51) Int. Cl.⁷ .............................. B62M 25/04; G05G 5/18
(52) U.S. Cl. .................................. 74/473.15; 74/473.28; 74/489; 74/502.2
(58) Field of Search .................... 74/473.15, 473.28, 74/489, 502.2

(56) References Cited

U.S. PATENT DOCUMENTS

| | | | |
|---|---|---|---|
| 5,673,594 | * 10/1997 | Huang et al. | 74/489 X |
| 5,791,195 | * 8/1998 | Campagnolo | 74/473.14 |
| 5,957,002 | * 9/1999 | Ueng | 74/502.2 |

\* cited by examiner

*Primary Examiner*—Allan D. Herrmann
(74) *Attorney, Agent, or Firm*—Browdy and Neimark

(57) ABSTRACT

A bicycle speed changing device comprises a base having a pivotal column mounted thereon such that the pivotal column is fitted over in sequence by a wire wheel, a ratchet gear, a check plate, a rotary plate, a reverse push rod, and a forward push rod. The wire wheel is retained step by step by the position-confining portion of the base and connected with a guide wire. The ratchet gear is provided with forward teeth and reverse teeth. The check plate is provided with a first retaining portion and a second retaining portion. The rotary plate is fastened pivotally with a reverse pawl and a stop portion. The reverse push rod is provided with a rotation stopping portion for retaining the stop portion of the rotary plate, and a push portion for urging the reverse pawl. The forward push rod is fastened pivotally with a forward pawl for catching the forward teeth of the ratchet gear. As the reverse push rod or the forward push rod is actuated to turn, the ratchet gear is actuated by the reverse pawl or the forward pawl, thereby causing the wire wheel to turn to pull the guide wire to attain a reverse speed-changing operation or a forward speed-changing operation.

11 Claims, 3 Drawing Sheets

BICYCLE SPEED CHANGING DEVICE

FIELD OF THE INVENTION

The present invention relates generally to a bicycle speed changing device, and more particularly to a bicycle speed changing device which is operated by two levers capable of returning automatically to an original position thereof after being released.

BACKGROUND OF THE INVENTION

The conventional bicycle speed changing device is operated by the swivelling lever such that the guide wire is actuated so as to attain the speed-changing action. This type of the bicycle speed changing device is rather inefficient at best in view of the fact that the device is often difficult for a bicyclist to maneuver after the device is located at a certain operating position or angle.

There is another conventional type of the bicycle speed changing device which is operated by two rods and is relatively complicated in construction, thereby resulting in a unreliable operation as well as a substantial increase in the production cost.

SUMMARY OF THE INVENTION

It is therefore the primary objective of the present invention to provide a bicycle speed changing device which can be operated with ease.

It is another objective of the present invention to provide a bicycle speed changing device which can be operated with precision.

In keeping with the principle of the present invention, the foregoing objectives of the present invention are attained by a bicycle speed changing device comprising a base, and a pivotal column over which a wire wheel, a ratchet gear, a check plate, a rotary plate, a reverse lever, a forward lever, and a fastening piece are sequentially fitted. The base is provided in the inner peripheral edge thereof with a position-confining portion for retaining a locating member of the wire wheel. The ratchet gear is provided with forward teeth and reverse teeth. The check plate is fastened with the base and provided with a first retaining portion and a second retaining portion. The rotary plate is provided with a stop portion, a reverse pawl for catching a reverse tooth of the ratchet gear, and an elastic member for providing an elastic force enabling the rotary wheel to turn such that the rotary plate presses against the second retaining portion of the check plate. The reverse lever has a rotation stopping portion capable of holding the stop portion of the rotary plate, and a push portion capable of pushing the reverse pawl. The forward lever has a forward pawl for catching the forward tooth of the ratchet gear, and an elastic member capable of actuating the forward lever to turn such that the forward lever urges the first retaining portion of the check plate.

In a forward operation, the forward lever is actuated to turn aside such that the forward pawl turns the ratchet gear, and that the wire wheel is actuated to pull the speed changing guide wire. In a reverse operation, the reverse lever is actuated such that the reverse lever urges the reverse pawl to catch the reverse teeth of the ratchet gear, thereby causing the ratchet gear to turn so as to actuate the wire wheel to pull the speed changing guide wire.

The foregoing objectives, features, and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
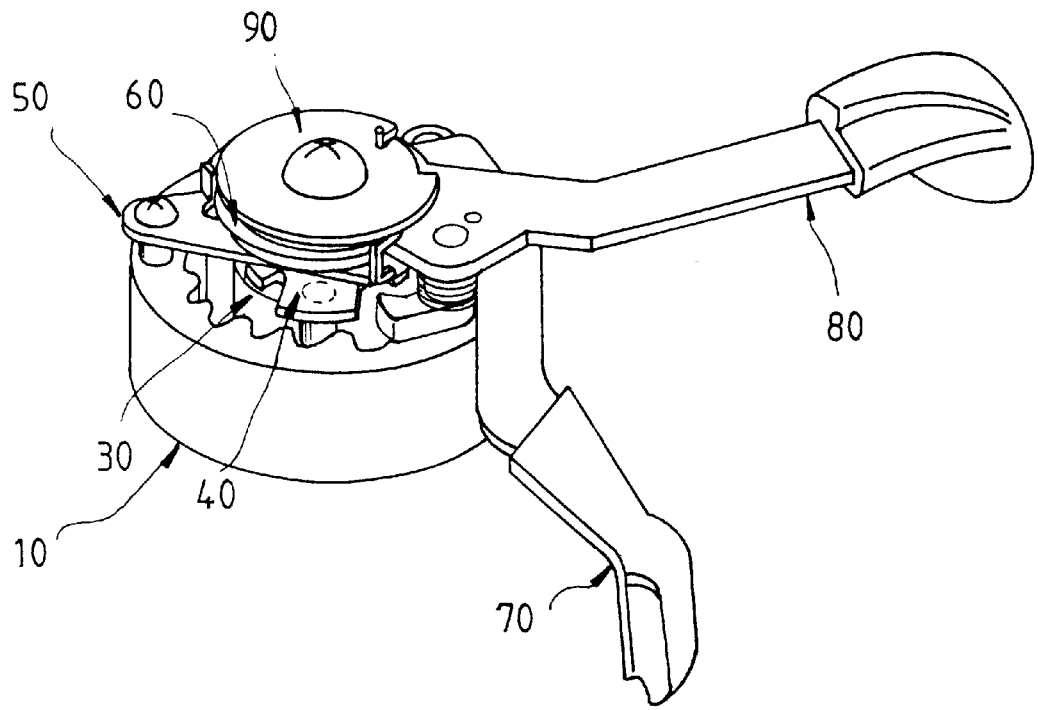
FIG. 1 shows a perspective view of the preferred embodiment of the present invention.

As shown in all drawings provided herewith, a bicycle speed changing device embodied in the present invention comprises a base 10, a pivotal column 20, a wire wheel 30, a ratchet gear 40, a check plate 50, a rotary plate 60, a reverse lever 70, a forward lever 80, and a fastening piece 90.

The base 10 is of a short cylindrical construction and is provided in the center of the bottom thereof with a pivoting hole 12, and a plurality of fastening holes 13 surrounding the pivoting hole 12. The base 10 is further provided in the inner wall thereof with a plurality of locating slots 15, located in the positioning confining portion 15' noted above in the summary of the invention a wire hole 16 for receiving a guide wire 1, and a threaded hole 18.

The pivotal column 20 has a shank portion 21 which is provided with two threaded holes 22 and 23, and a bottom disk 24 having a plurality of pillars 241 corresponding in location to the fastening holes 13 of the base 10.

The wire wheel 30 is provided with a pivoting hole 31 fitted over the pivotal column 20, a wire head slot 33, a retaining portion 34, a link block 37, and a locating member 36 engaging the retaining portion 34. The locating member 36 is elastic and is provided with a retaining end 361 corresponding to the locating slot 15 of the base 10.

The ratchet gear 40 is provided with a pivoting hole 41 fitted over the pivotal column 20, a plurality of forward teeth 42 and reverse teeth 43, an urging pillar 44 for pushing the locating member 36 of the wire wheel 30, and a link slot 45 for retaining the link block 37 of the wire wheel 30.

The check plate 50 is provided with a pivoting hole 51 fitted over the pivotal column 20, a fastening hole 52 engaging a screw 53 which is in turn engaged with the threaded hole 18 of the base 10, a first retaining portion 54, a retaining hook 55, and a second retaining portion 56.

The rotary plate 60 is provided with a pivoting hole 61 by which the rotary plate 60 is fitted over the pivotal column 20, a pivot pin 62 fastened pivotally with a reverse pawl 65, a stop portion 63 located in the outer periphery thereof, and a volute spring 67 whose one end is retained by the retaining hook 55 of the check plate 50. The reverse pawl 65 has a pawl portion 651 engageable with the reverse teeth 43 of the ratchet gear 40, and a pushed portion 652.

The reverse lever 70 is provided with a pivoting hole 71 by which the reverse lever 70 is pivotally fitted over the pivotal column 20, a push portion 72 for pushing the pushed portion 652 of the reverse pawl 65, a rotation stopping portion 73 engaging the stop portion 63 of the rotary plate 60, a push handle 74, and a partition ring 76 which is disposed in the pivoting hole 71.

The forward lever 80 is provided with a pivoting hole 81 by which the forward lever 80 is pivotally fitted over the pivotal column 20, a push handle 82, a pivotal pin 84 to which a volute spring 85 and a forward pawl 86 are pivoted. The forward pawl 86 has a pawl portion 861 engageable with the forward teeth 42 of the ratchet gear 40. A partition ring 88 and a volute spring 89 are provided.

The fastening piece 90 is provided with a pivoting hole 91 by which the fastening piece 90 is fitted over the pivotal column 20 and is fastened with the pivotal column 20 by a screw 96 which is engaged with the threaded hole 23 of the pivotal column 20. The fastening piece 90 is further provided with a spring retaining portion 92 for retaining the volute spring 89.

Figure 3:
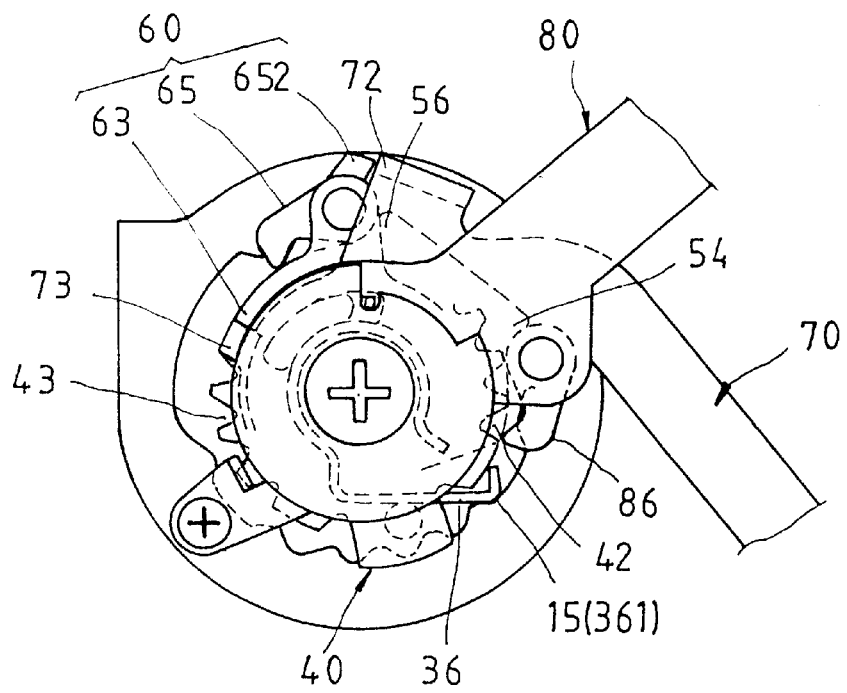
FIG. 3 shows a top view of the preferred embodiment of the present invention.
Figure 2:
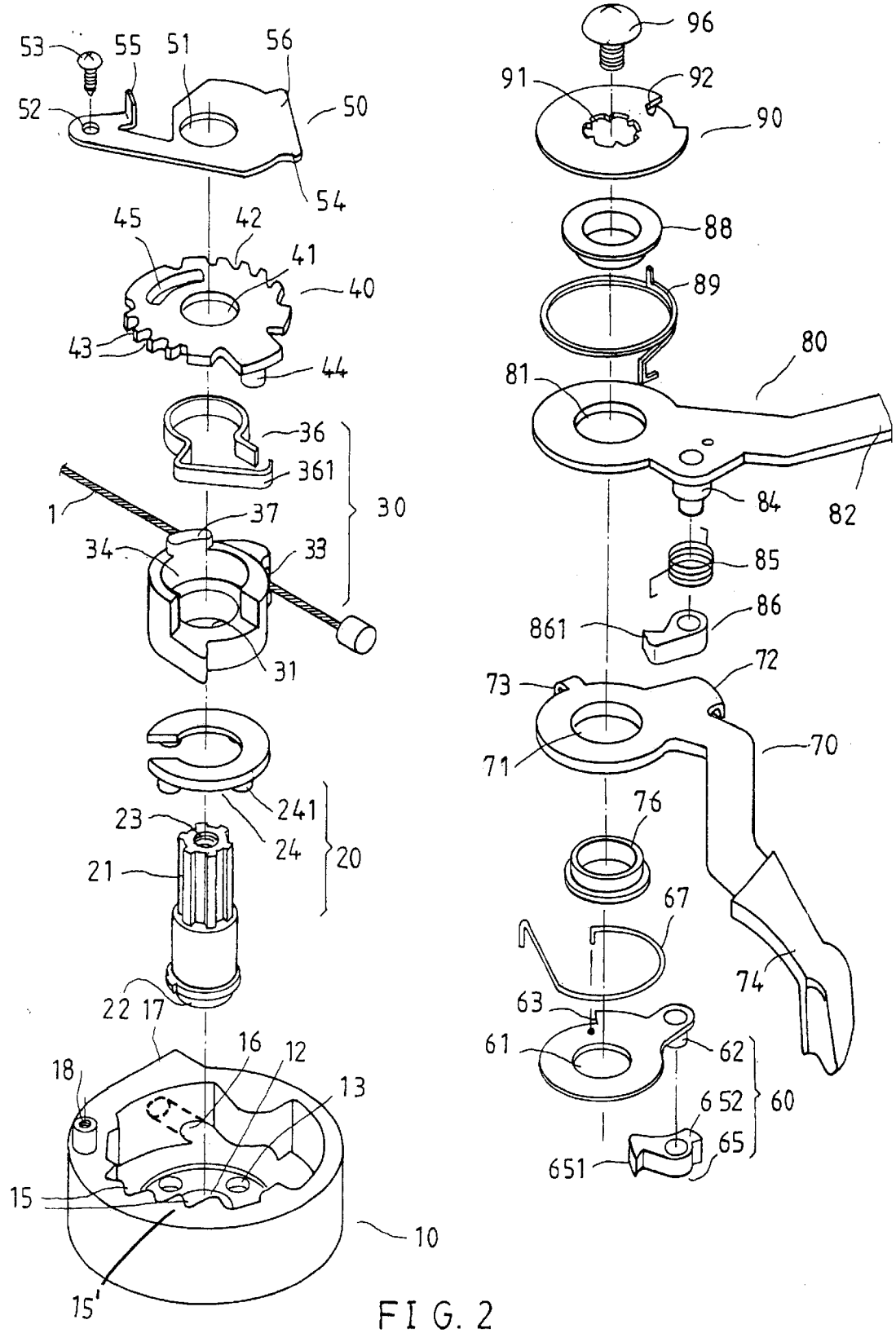
FIG. 2 shows an exploded view of the preferred embodiment of the present invention.

As shown in FIG. 3, the forward push rod and the reverse push rod are not in action. The rotary plate 60 is acted on by the elastic force of the volute spring 67 such that the rotary plate 60 is so turned as to cause the back portion 652 of the reverse pawl 65 to urge the push portion 72 of the reverse lever 70. In the meantime, the reverse pawl 65 is stopped at the second retaining portion 56 of the check plate 50. The rotation stopping portion 73 of the reverse lever 70 is stopped at the stop portion 63 of the rotary plate 60. The forward pawl 86 of the forward lever 80 is forced by the elastic force of the volute spring 89 to press against the first retaining portion 54 of the check plate 50.

Figure 4:
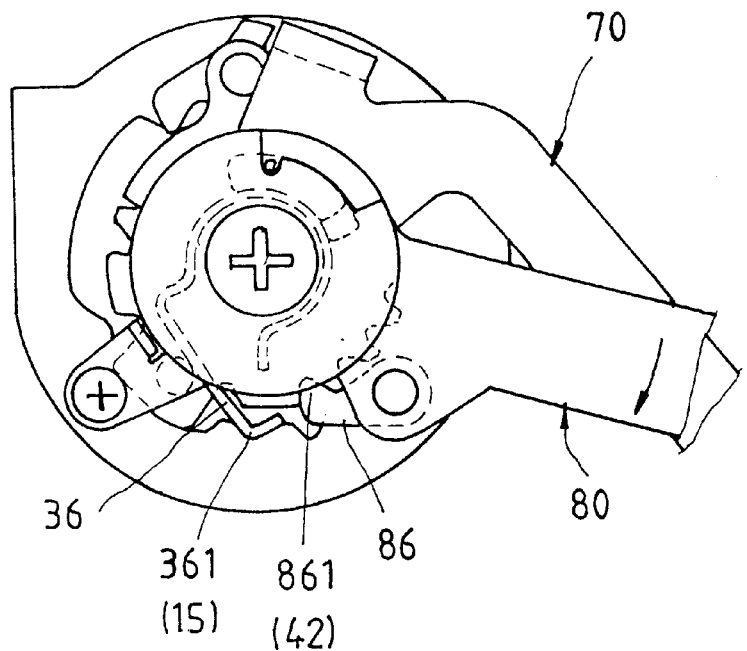
FIG. 4 shows a top view of the preferred embodiment of the present invention in action.

Now referring to FIG. 4, the forward lever of the present invention is shown to be in action such that the wire wheel is actuated by the forward push rod. In operation, the push handle 82 of the forward lever 80 is actuated to turn clockwise on the pivotal column 20, whereas the forward pawl 86 is acted on by the elastic force of the volute spring 85 to turn such that the pawl portion 861 of the forward pawl 86 is engaged with one of the forward teeth 42 of the ratchet gear 40. The locating member 36 of the wire wheel 30 is located step by step in the locating slots 15 of the base 10, thereby causing the forward pawl 86 to actuate the wire wheel 30 and the ratchet gear 40 to turn so as to pull the guide wire 1 to attain the forward speed-changing of the bicycle.

Figure 5:
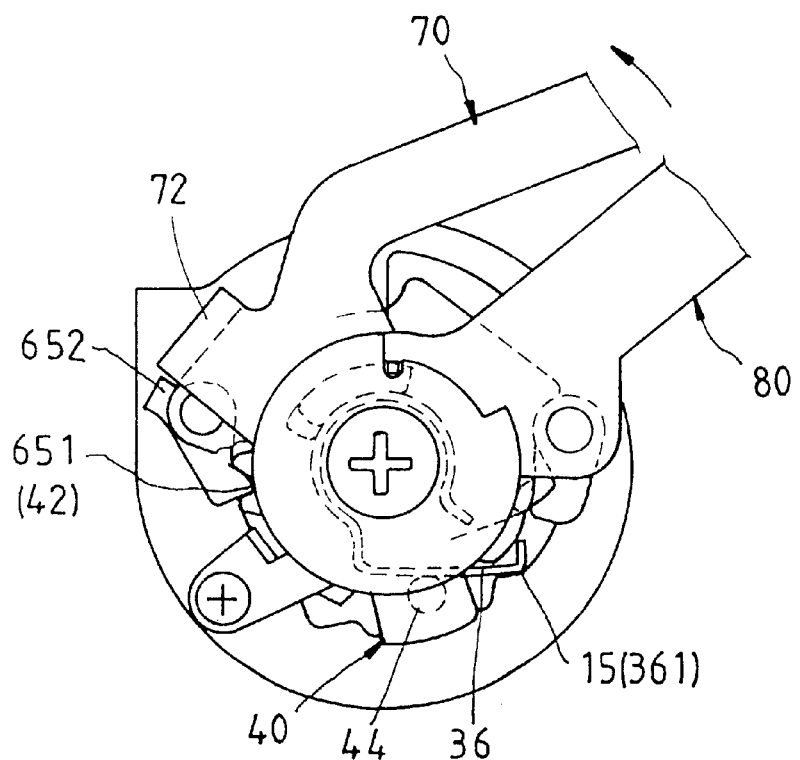
FIG. 5 shows another top view of the preferred embodiment of the present invention in action.

As shown in FIG. 5, the reverse lever 70 is in action to actuate the wire wheel 30. In operation, the push handle 74 of the reverse lever 70 is actuated to turn counterclockwise on the pivotal column 20. In the meantime, the push portion 72 of the reverse lever 70 presses against the pushed portion 652 of the reverse pawl 65, so as to cause the pawl portion 651 to locate at the reverse teeth 43 of the ratchet gear 40. The locating member 36 of the wire wheel 30 is urged by the urging pillar 44 of the ratchet gear 40 to locate step by step at the locating slots 15 of the base 10. The ratchet gear 40 is thus turned to actuate the wire wheel 30 to turn to pull the guide wire 1, thereby resulting in the reverse speed-changing of the bicycle.

The component parts described above in sequence are fitted over the pivotal column 20 in that sequence.

When the reverse lever 70 in action or the forward push rod 80 in action is released by hand of a bicyclist, the reverse lever 70 or the forward lever 80 is acted on by the elastic force to return automatically to its pre-operation position as shown in FIG. 3.

The device of the present invention enables a bicyclist to carry out a step-by-step forward speed changing operation, or a step-by-step reverse speed changing operation. In addition, the reverse lever in action or the forward lever in action of the present invention is capable of returning automatically to its pre-operation position as soon as it is released by hand of the bicyclist.

The device of the present invention provides a precision speed-changing operation and is compatible with various speed changing devices and handlebars.

What is claimed is:

1. A bicycle speed changing device comprising a base having a pivotal column mounted thereon such that said pivotal column is sequentially fitted over by a wire wheel, a ratchet gear, a check plate, a rotary plate, a reverse lever, and a forward lever;

wherein said base is provided therein with a position-confining portion;

wherein said wire wheel is provided with a locating member for a step-by-step engagement with said position-confining portion of said base and is further provided with a wire head slot;

wherein said ratchet gear is linked with said wire wheel and is provided with a plurality of forward teeth and reverse teeth;

wherein said check plate is provided with a first retaining portion and a second retaining portion and is fastened with a predetermined position of said base;

wherein said rotary plate is provided with a stop portion, a reverse pawl for retaining said reverse teeth of said ratchet gear, and an elastic member for providing said rotary plate with an elastic force enabling said rotary plate to turn to press against said second retaining portion of said check plate;

wherein said reverse lever is provided with a rotation stopping portion for retaining said stop portion of said rotary plate, and a push portion for pushing said reverse pawl of rotary plate;

wherein said forward lever is provided with a forward pawl for retaining said forward teeth of said ratchet gear, and an elastic member for actuating said forward push rod to turn to press against said first retaining portion of said check plate;

said reverse lever and said forward push lever rod being located respectively at a predetermined position while not in action whereby said forward lever is actuated by hand of a bicyclist to cause said forward pawl to turn said ratchet gear, thereby actuating said wire wheel to turn to pull a guide wire to attain a forward speed-changing operation whereby said reverse lever is actuated by hand of the bicyclist to cause said push portion to push said reverse pawl to locate at said reverse teeth of said ratchet gear, thereby causing said ratchet gear to turn, and actuating said wire wheel to turn to pull said guide wire to attain a reverse speed-changing operation.

2. The device as defined in claim 1, wherein said locating member of said wire wheel is an elastic piece; and wherein said wire wheel is provided with a retaining portion for retaining said locating member.

3. The device as defined in claim 1, wherein said position-confining portion of said base is provided with a plurality of locating slots.

4. The device as defined in claim 1, wherein said elastic member of said rotary plate is a volute spring; and wherein said elastic member of said forward lever is a volute spring.

5. The device as defined in claim 1, wherein said wire wheel is further provided with a link block; and wherein said ratchet gear is further provided with a link slot for receiving said link block of said wire wheel.

6. The device as defined in claim 1, wherein said locating member is provided with a retaining end.

7. The device as defined in claim 1, wherein said check plate further provides a retaining hook for retaining said elastic member.

8. The device as defined in claim 1, wherein said base is provided with a wire hole for receiving said guide wire.

9. The device as defined in claim 1, wherein said check plate is fastened with said base by a screw.

10. The device as defined in claim 1, wherein said forward lever and said reverse lever are provided with a partition ring.

11. The device as defined in claim 1, wherein said ratchet gear is provided with an urging pillar for pushing said locating member of said wire wheel.

* * * * *